United States Patent
Rosemeier et al.

(10) Patent No.: US 8,236,078 B2
(45) Date of Patent: Aug. 7, 2012

(54) FILTER BAG

(75) Inventors: Brigitte Rosemeier, Vlotho (DE); Wolfgang Czado, Minden (DE)

(73) Assignee: Wolf PVG GmbH & Co. KG, Vlotho (DE)

( * ) Notice: Subject to any disclaimer, the term of this patent is extended or adjusted under 35 U.S.C. 154(b) by 366 days.

(21) Appl. No.: 12/482,191

(22) Filed: Jun. 10, 2009

(65) Prior Publication Data

US 2009/0301043 A1 Dec. 10, 2009

(30) Foreign Application Priority Data

Jun. 10, 2008 (DE) .................... 20 2008 007 717 U

(51) Int. Cl.
*B01D 46/02* (2006.01)

(52) U.S. Cl. .......... 55/382; 55/486; 55/DIG. 2; 15/347; 15/DIG. 8

(58) Field of Classification Search .............. 55/382, 55/524, DIG. 2, DIG. 3, DIG. 5; 15/347, 15/352, 353; 156/199, 200, 201, 202, 203; 264/145, 159, 160, 171.1, DIG. 48
See application file for complete search history.

(56) References Cited

U.S. PATENT DOCUMENTS

| | | | | | |
|---|---|---|---|---|---|
| 3,479,802 A | * | 11/1969 | Fesco | ........................... | 55/367 |
| 4,119,414 A | * | 10/1978 | Smaling | ........................... | 95/287 |
| 4,670,030 A | * | 6/1987 | Schultz | ........................... | 55/370 |
| 4,749,386 A | * | 6/1988 | Strohmeyer et al. | ........................... | 96/58 |
| 5,074,997 A | * | 12/1991 | Riley et al. | ........................... | 96/222 |
| 5,240,484 A | * | 8/1993 | Genovese et al. | ........................... | 96/226 |
| 5,522,908 A | * | 6/1996 | Frey | ........................... | 55/309 |
| 5,647,881 A | * | 7/1997 | Zhang et al. | ........................... | 55/382 |
| 6,063,171 A | * | 5/2000 | Moyher et al. | ........................... | 96/226 |
| 6,156,086 A | * | 12/2000 | Zhang | ........................... | 55/382 |
| 6,171,369 B1 | * | 1/2001 | Schultink et al. | ........................... | 95/57 |
| 6,183,536 B1 | * | 2/2001 | Schultink et al. | ........................... | 95/57 |
| 6,251,154 B1 | * | 6/2001 | van Rossen | ........................... | 55/382 |
| 6,802,879 B2 | * | 10/2004 | Scanlon | ........................... | 55/367 |
| 7,615,109 B2 | * | 11/2009 | Sepke et al. | ........................... | 96/222 |

FOREIGN PATENT DOCUMENTS

DE  20 2005 009 452 U1  9/2005
DE  20 2006 016 303     1/2007

* cited by examiner

*Primary Examiner* — Duane Smith
*Assistant Examiner* — Minh-Chau Pham
(74) *Attorney, Agent, or Firm* — Venable LLP; Robert Kinberg; Leigh D. Thelen

(57) ABSTRACT

A filter bag includes a first filter material layer including an inflow opening, a second filter material layer having edges along which the second filter layer is joined to the first filter material layer to form an inside space; and a flat, multi-layer filter insert arranged in the inside space and having sections connected, respectively, to the first and second material layers. The filter insert has at least two outer layers defining an intermediate area there between. The intermediate area includes a center layer or an intermediate space for dust collection.

16 Claims, 4 Drawing Sheets

FILTER BAG

CROSS-REFERENCE TO RELATED APPLICATION

This application claims the priority of German Patent Application No. 20 2008 007 717.6, filed on Jun. 10, 2008, the subject matter of which is incorporated herein by reference.

BACKGROUND OF THE INVENTION

The present invention relates to a filter bag, in particular used for vacuum cleaners, consisting of a first filter material layer with an inflow opening and a second filter material layer, which is connected along the edges to the first filter material layer to form an inside space, wherein a multi-layer, flat filter insert is arranged on the inside and is joined at least in some sections to the first, respectively the second, filter material layer.

The document DE 20 2005 009 452 discloses a vacuum cleaner bag, having an upper filter material layer that is welded along the edges to a lower filter material layer. An inflow opening is formed in one filter material layer, wherein a cushion with material for absorbing unpleasant odors is provided on the side opposite the inflow opening. Once a vacuum cleaner bag of this type is loaded with dust, the dust will clog the filter material layers, thereby resulting in a reduction of the volume flow and thus also in a drop in the suction capacity.

To improve the dust-collection capacity of a vacuum cleaner bag, German patent document DE 20 2006 016 303 discloses a filter bag provided with a separating wall on the bag inside, so that a portion of the dust can be deposited thereon. As a result, the filter material layers on the outside of the vacuum cleaner bag will be clogged less with dust deposited thereon. To be sure, a separating wall of a flat filter material is easy and cheap to integrate into the vacuum cleaner bag during the production process, but the dust-collection capacity of such a separating wall for dividing the vacuum cleaner bag is limited.

SUMMARY OF THE INVENTION

It is therefore an object of the present invention to create a filter bag, in particular used for vacuum cleaners, which has a particularly high dust collection capacity and which ensures that the lowest possible amount of dust is deposited on the outer filter material layers during the filling of the bag with dust.

The above and other objects of the invention are achieved according to the invention by the provision of a filter bag, comprising: a first filter material layer including an inflow opening; a second filter material layer having edges along which the second filter layer is joined to the first filter material layer to form an inside space; and a flat, multi-layer filter insert arranged in the inside space and having sections connected, respectively, to the first and second material layers, the filter insert having at least two outer layers defining an intermediate area there between, wherein the intermediate area includes one of a center layer or an intermediate space for dust collection.

Thus, according to the invention, the filter insert is provided with at least two outer layers, between which an intermediate layer or an intermediate space is provided for collecting the dust. The dust-loaded air can be blown into the filter insert during the operation, such that the dust can collect in the center layer or the intermediate space where it is pre-filtered. The dust deposited in the filter insert can therefore no longer clog the outer filter material layers of the filter bag.

During the continued operation of filling the filter bag with dust, the dust initially fills the filter insert, so that the outer filter material layers will be clogged less and the drop in the volume flow is lower while the suction capacity remains the same. With an increasing amount of dust deposited in the softer core, the core will expand and, during a further dust collection, will even be torn apart and destroyed, so that the two outer layers with higher strength are pushed apart and the formerly flat filter insert will automatically be reshaped into a three-dimensional, bag-type filter. Since the filter insert is initially embodied flat, it can be integrated easily into the filter bag during a production process.

The outer layer on the side facing the inflow opening is advantageously provided with at least one opening for dust-loaded air to flow into the center layer.

According to one embodiment, the filter insert has a center layer that is enclosed on respectively opposite sides by respectively one outer layer with increased strength. The outer layers can have a 50% higher tensile strength, for example, than the center layer to ensure that the outer layers are not accidentally damaged during the depositing of the dust in the center layer. The force required for removing an outer layer from the center layer or from the other outer layer in this case can exceed 2 N for a 20 mm wide sample body.

According to one preferred embodiment of the invention, the filter insert is composed of several layers of a nonwoven material. The nonwoven material can be smoothed on both outsides and have a soft core, so that the voluminous, fluffy center layer is used as dust collector.

The opening on the side of an outer layer that is facing the inflow opening can be formed by having a predetermined breakage point which tears open during use. As a result, the filter insert can remain undamaged until it is used, wherein the predetermined breakage point makes it possible to create a purposeful opening in the outer layer, on the side facing the inflow opening. As an alternative, several small openings can be formed in the outer layer, which allow the dust-loaded air to flow into the filter insert. It is also possible to provide the outer layer on the side facing the inflow opening with punched holes, slots or other openings, which ensure the flow into the filter insert.

The filter bag according to a different embodiment is provided with a filter insert of a spunbond material, with thermally reinforced outer sides. The reinforcing of the outer layers can be realized wet, chemically, thermally, mechanically, through needling, or with the aid of a water jet. In addition, the outer layers can also be provided with a perforated film or other flat materials.

The outer layers may have a higher permeability for air than the filter material layers. The outer layers of the filter insert consequently form a type of pre-filter while the filter material layers include at least one layer that functions as micro-filter and can filter out extremely small particles.

To ensure that the filter insert has a sufficient dust-collecting volume, the thickness of the center layer can be at least three times, preferably five times, the thickness of an outer layer. The center layer furthermore can have a thickness of more than 2 mm, preferably of more than 4 mm.

For an easy fastening of the filter insert inside the filter bag, the filter insert can be attached along at least one seam between the first and the second filter material layer. The two filter material layers are joined along at least one side, if applicable along all four sides with a seam, preferably a welded seam. If the filter insert is attached at the same time as the seam is produced, no special operation is needed for securing the filter insert. In that case, the filter insert can advantageously be attached along three or four side seams, between the first and the second filter material layer.

According to a another embodiment of the invention, the filter insert is connected to the first material layer in an area adjacent to the inflow opening. As a result, it is ensured that the filter insert is not only pressed against a filter material layer by the incoming volume flow, but is also suspended loosely inside the filter bag because it is attached on one side to the first filter material layer, adjacent to the inflow opening, and can be connected on the other side to a seam in the side region of the first and second filter material layer, which means that the filter insert is suspended loosely inside the filter bag.

To be able to secure the filter insert effectively inside the filter bag during a running production process, the filter insert can be embodied as continuous strip which is respectively attached at the end, along a seam between a first and second filter material layer.

BRIEF DESCRIPTION OF THE DRAWINGS

These and other features and advantages of the invention will be further understood from the following detailed description of the embodiments of the invention, with reference to the accompanying drawings.

DETAILED DESCRIPTION

Figure 1A:
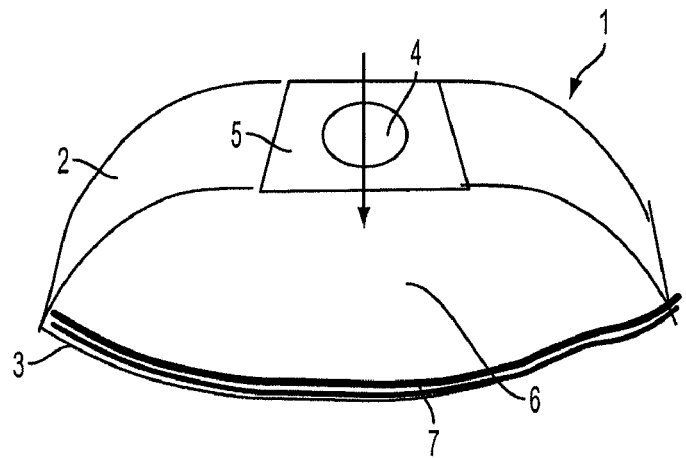
FIGS. 1A and 1B show two views of a first embodiment of a filter bag according to the invention.
Figure 1B:
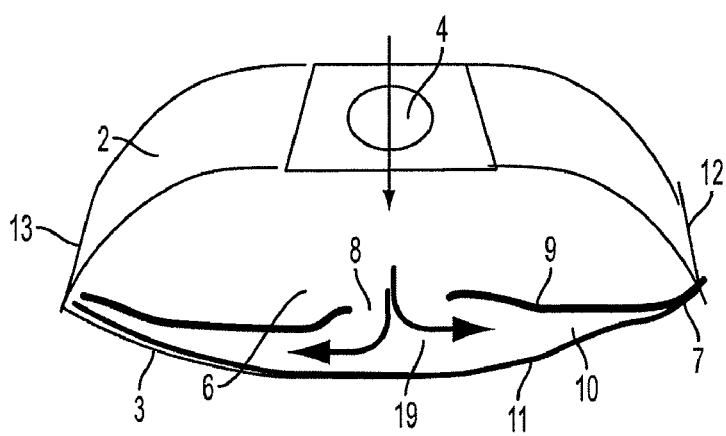

Referring to FIGS. 1A and 1B there is shown a filter bag 1 which comprises a first upper filter material layer 2 with an inflow opening 4 embodied therein. The first filter material layer 2 is connected on all sides along the edges to a second filter material layer 3, for example with the aid of a welded seam. The filter material layers 2 and 3 can be composed of a multi-layer nonwoven material, which is provided with at least one micro-filter layer, for example a meltblown layer.

Around the inflow opening 4, a holding disc 5 is provided for attaching the filter bag 1 to a vacuum cleaner. An inside space 6 in which dust can collect during the operation is embodied between the first filter material layer 2 and the second filter material layer 3.

To increase the dust collection capacity of the filter bag 1, an inside space 6 is provided with a filter insert 7 that rests fully on the second filter material layer 3 and is attached along the edge to the seam between the first filter material layer 2 and the second material layer 3.

The filter insert 7 comprises a filter layer 10 that is enclosed on opposite sides by respective outer layers 9 and 11, wherein the outer layers 9 and 11 have a higher strength than the thicker middle layer 10. The filter insert 7 is provided on the side facing the inflow side 4 with at least one opening 8, which is formed in outer layer 9 of the filter insert.

During operation, air can flow through the opening 4 into the inside space 6 where it meets the outer layer 9 of the filter insert 7. One or several openings 8 are provided in the region where the air flow hits, which openings allow the incoming air to flow into the filter insert 7. An inside space 19 in the filter insert 7 is thus filled with dust, which is collected there by the material of the center layer 10. The filter insert 7 consequently forms a pre-filter for collecting a portion of the dust, thereby preventing this dust from being deposited in the filter material layers 2 and 3. The dust-loaded air flow enters the softer center layer 10 and dust is deposited in the filter insert 7, which causes the center layer 10 to expand. With additional dust collecting in the center layer 10, the filter insert 7 can even tear apart, thereby pushing apart the two stronger outer layers 9 and 11 and causing the flat filter insert to automatically reshape itself into a three-dimensional bag.

Figure 2:
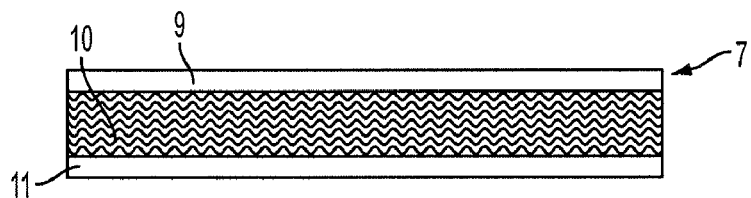
FIG. 2 shows a detailed view of the filter insert for the filter bag according to FIG. 1.

FIG. 2 shows a sectional view through the filter insert 7. A thicker middle layer 10 is enclosed by two outer layers 9 and 11. The center layer 10 has a thickness of at least 2 mm, preferably 4 to 10 mm. The center layer can be composed of a soft and fluffy material, preferably a spunbond material. The outer layers 9 and 11 are composed of a material with higher strength than the center layer, for example a reinforced nonwoven material. It is possible to produce the filter insert 7 by thermally reinforcing a spunbond material with the aid of an embossing calendar, such that only the surface of the spunbond is reinforced through plasticizing and melting together of the fibers, but that the center layer 10 remains fluffy and soft.

To provide an opening 8 in the outer layer 9, slots or perforations can be inserted into the material or holes can be punched in. A predetermined breakage point can be provided in the outer layer 9, which tears open during the operation and forms an opening 8 that allows dust to collect in the filter insert 7.

Figure 3A:
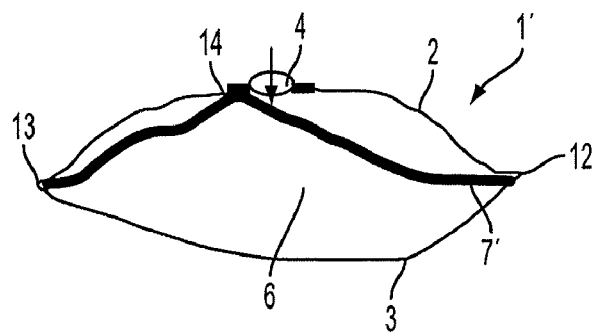
FIGS. 3A to 3C show several views of a second embodiment of a filter bag according to the invention.
Figure 3B:
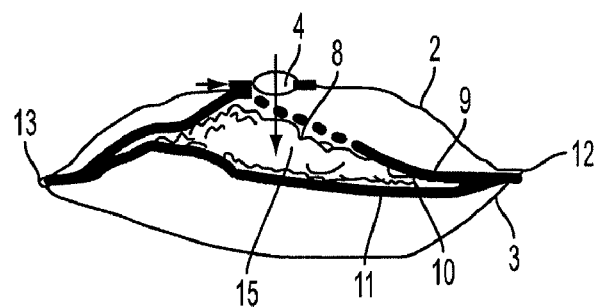
Figure 3C:
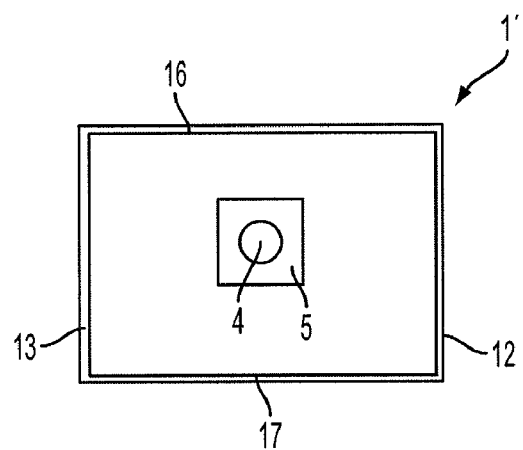

FIGS. 3A to 3C show a modified embodiment of a filter bag 1'. A filter insert 7' is provided in an inside space 6, between the filter material layers 2 and 3, which filter insert is attached along a first side to a seam 12, in the region where the first filter material layer 2 is connected to the second filter material layer 3, and is attached on the opposite side along a seam 13 of the first and second filter material layers 2 and 3. So that the filter insert 7' is not pushed onto the lower filter-material layer 3, the filter insert 7' has an additionally attachment location 14, for example a welded seam, which is arranged in the center region of the filter material layer 2, meaning in an area adjacent to the inflow opening 4. The filter insert 7' is consequently suspended loosely in this space 6, thereby allowing air to flow on all sides around the filter insert 7'.

FIG. 3B shows the filter insert 7' in the filled state. The filter insert 7' comprises an outer layer 9, with therein embodied one or several openings 8, so that air flowing in through the inflow opening 4 can pass through the openings 8 and so that dust 15 can collect in the region of the center layer 10. The filter insert 7' functions as a pre-filter to keep the filter material layers 2 and 3 from being clogged up too quickly with dust.

FIG. 3C provides a sectional view through the inside region of the filter bag 1', showing the seams 12, 13, 16 and 17 that connect the first filter material layer 2 to the second filter material layer 3, preferably with the aid of ultrasonic welding. The filter insert 7' extends fully inside the filter bag 1' and has approximately the same size as the filter material layers 2 or 3.

Figure 4A:
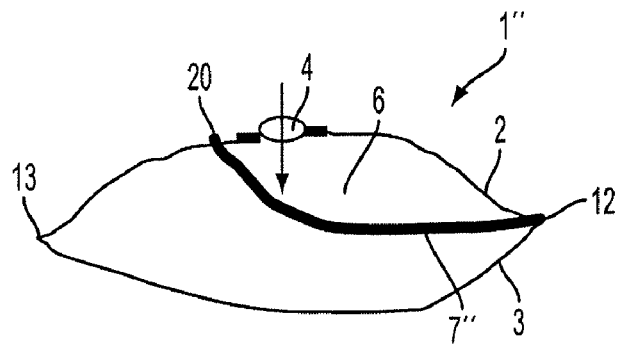
FIGS. 4A to 4C show several views of a third embodiment of a filter bag according to the invention.
Figure 4B:
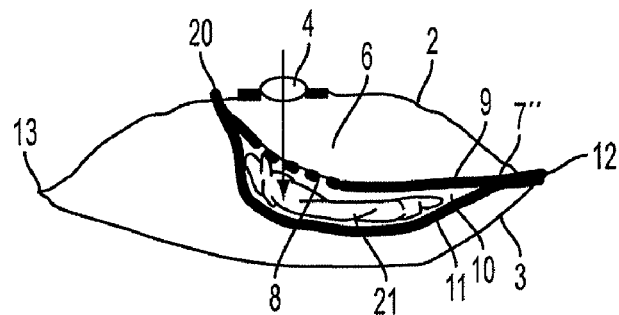
Figure 4C:
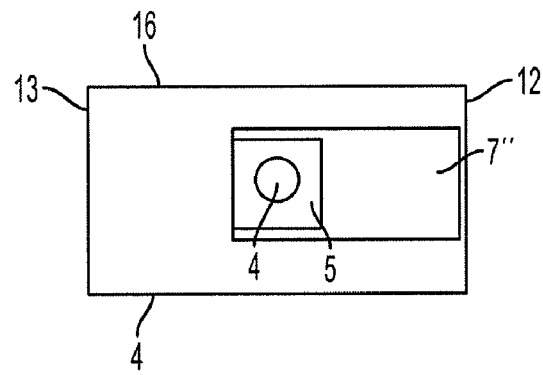

FIGS. 4A to 4C show a different embodiment of a filter bag 1" according to the invention, wherein a filter insert 7" is attached in an inside space 6 between a first filter material layer 2 and a second filter material layer 3.

The filter insert 7" is smaller in size than one of the filter material layers 2 or 3, wherein the filter insert 7" is attached along a seam 12 between a first and a second filter material layer 2 and 3. On the opposite side, the filter insert 7" is attached along a seam 20 that is arranged adjacent to the inflow opening 4, wherein the filter insert 7" is joined to the filter material layer 2 along this seam 20. As a result, the filter insert 7" is suspended loosely inside the space 6, so that air can flow around both outer layers 9 and 11. The filter insert 7" is noticeably smaller than the filter material layer 2 or 3, as can be seen in FIG. 4C. A high dust-collecting volume can thus be achieved, even if the material use is lower. In this case as well, the air flowing in through the opening 4 can flow through the openings 8 in the outer layer 9 into the filter insert 7", so that the dust 21 can collect in a center layer 10 of the filter insert 7" and is thus prevented from clogging the filter material layers 2 and 3.

With the preceding embodiments, the filter insert 7, 7', 7" functions as a type of pre-filter, wherein the outer layers 9 and 11 have a higher permeability for air than the filter material layers 2 and 3. The shape of the filter insert 7 can be designed freely over a wide range, as long as the inflowing air can flow into the filter insert and dust can collect in a center layer 10.

Figure 5:
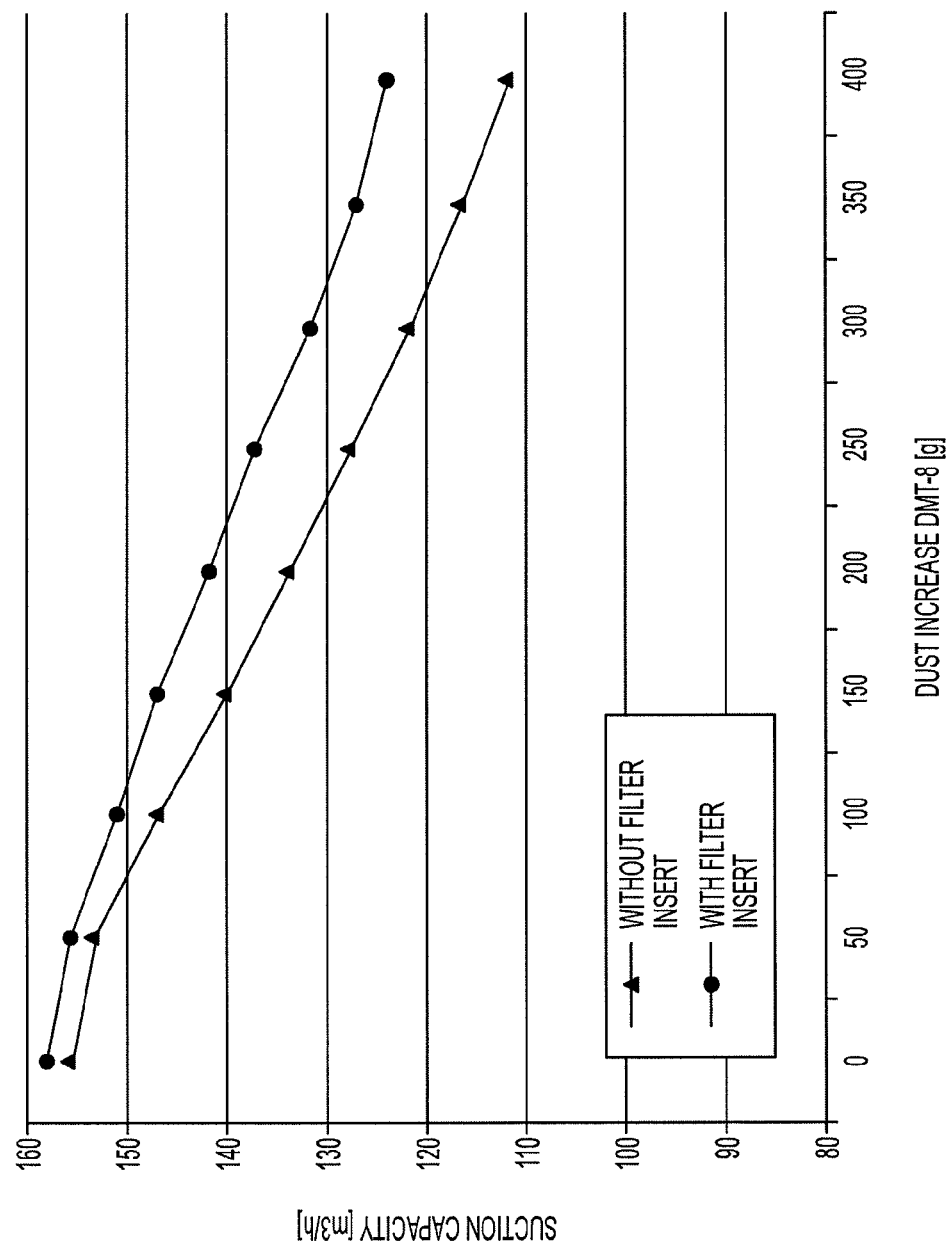
FIG. 5 is a diagram showing the drop in the volume flow for a filter bag according to the invention.

FIG. 5 shows a diagram of the suction capacity relative to the filling of a vacuum cleaner bag. A first bag without filter insert is inserted into a vacuum cleaner. The vacuum cleaner is operated with a specific capacity. And, the suction volume flow is measured while the vacuum cleaner bag increasingly fills up with dust. The vacuum cleaner bag used in this example consists of a five-layer nonwoven material, comprising a layer of spunbond 15 g/m$^2$, a layer of volume nonwoven 55 g/m$^2$, a layer of spunbond 15 g/m$^2$, a layer of meltblown 25 g/m$^2$ and a layer of spunbond 25 g/m$^2$.

For a comparison, a vacuum cleaner bag consisting of the aforementioned materials was additionally provided with a filter insert in the lower inside area of the bag. The filter insert consisted of a partially reinforced spunbond material of approximately 60 g/m$^2$ and welded along all four sides to the seams of the filter bag as shown in FIG. 1A.

FIG. 5 shows the drop in the volume flow for the vacuum cleaner bag without filter insert, which is noticeably higher than for the vacuum cleaner bag with filter insert according to the present invention.

According to an embodiment that is not shown herein, the filter insert 7, 7' and 7" can also consists of two only slightly joined, in particular glued together, layers between which dust can collect. In that case, an intermediate space is formed in place of the center layer between the outer layers of the filter insert, which is then filled with dust and expands as a result of the filling with dust.

The filter insert can also consist of a nonwoven material that is smoothed on both sides and has a soft core, or it can consist of two or more joined nonwoven materials. The nonwoven materials can include different types of spunbond, meltblow, carded nonwoven (wet, chemical, thermal, mechanical, reinforced through needling or with a water jet), foamed rubber, perforated film, grid clutch, glass or mineral wool, or a combination thereof.

Combinations of at least two air-permeable nonwoven materials having a permeability for air of at least 100 liters/m$^2$s at 2 mbar differential pressure can furthermore be used for the filter insert, wherein the nonwoven materials are joined lightly and the force required for separating the two nonwoven materials is higher than 2N for 20 mm wide sample bodies. With an at least three-layer configuration, the nonwoven materials on the outside have a 50% higher strength than a nonwoven material in the center.

It will be understood that the above description of the present invention is susceptible to various modifications, changes and adaptations, and the same are intended to be comprehended within the meaning and range of equivalents of the appended claims.

What is claimed is:

1. A filter bag, comprising:
a first filter material layer including an inflow opening;
a second filter material layer having edges along which the second filter layer is joined to the first filter material layer to form an inside space;
a pre-filter comprising a flat, multi-layer filter insert arranged in the inside space and having sections connected, respectively, to the first and second material layers, the filter insert having at least two outer layers having a higher permeability for air than the first and second filter material layers and defining an intermediate area there-between, wherein one of the outer layers includes at least one opening on a side facing the inflow opening, and at a distance from the inflow opening, so that dust-laden air can flow into the intermediate area, and wherein the intermediate area includes one of a center layer or an intermediate space for dust collection.

2. The filter bag according to claim 1, wherein the intermediate area comprises the center layer and the outer layers enclosing the center layer of the filter insert have a higher strength than the center layer.

3. The filter bag according to claim 2, wherein the outer layers have an at least 50% higher tensile strength than the center layer.

4. The filter bag according to claim 1, wherein the filter insert comprises a multi-layer nonwoven material.

5. The filter bag according to claim 1, wherein the at least one opening comprises a predetermined breakage point that is torn open during use.

6. The filter bag according to 1, wherein at least one of the outer layers of the filter insert include a plurality of small openings.

7. The filter bag according to claim 1, wherein the two outer layers of the filter insert comprises a spunbound material that is thermally reinforced.

8. The filter bag according to claim 1, wherein the two outer layers of the filter insert include at least two layers of an air-permeable material having a permeability of at least 100 liters/m$^2$s at 2 mbar differential pressure, and the two outer layers are connected and are pushed apart during filling.

9. The filter bag according to claim 1, wherein the intermediate area comprises the center layer and the center layer is at least three times as thick as each of the outer layers of the filter insert.

10. The filter bag according to claim 1, wherein the intermediate area comprises the center layer and the center layer is at least five times as thick as each of the outer layers.

11. The filter bag according to claim 1, wherein the intermediate area comprises the center layer and the center layer has a thickness of more than 2 mm.

12. The filter bag according to claim 1, wherein the intermediate area comprises the center layer and the center layer has a thickness of more than 4 mm.

13. The filter bag according to claim 1, wherein the filter insert is attached along at least one seam between the first and the second material layers.

14. The filter bag according to claim 1, wherein the filter insert is attached along at least three seams between the first and the second filter material layer.

15. The filter bag according to claim 1, wherein the filter insert is connected to the first filter material layer in a region adjacent to the inflow opening.

16. The filter bag according to claim 1, wherein the filter insert comprises a continuous strip having ends attached to respectively one seam between the first and the second filter material layer.

* * * * *